Mar. 20, 1923.

A. SENIW

GEARING

Filed June 29, 1922.

1,449,353

WITNESSES
Fred. W. Ely,
P. H. Pattison.

INVENTOR
Atanaze Seniw.
BY
ATTORNEYS

Patented Mar. 20, 1923.

1,449,353

UNITED STATES PATENT OFFICE.

ATANAZE SENIW, OF NEW YORK, N. Y.

GEARING.

Application filed June 29, 1922. Serial No. 571,608.

*To all whom it may concern:*

Be it known that I, ATANAZE SENIW, a citizen of the United States, and a resident of the city of New York, Glendale, borough of Queens, in the county of Queens and State of New York, have invented a new and Improved Gearing, of which the following is a full, clear, and exact description.

The present invention relates to new and useful improvements in gearing and it pertains more particularly to a gearing especially adapted for driving two alined shafts in the same direction.

It is one of the objects of the invention to provide a gearing in which two shafts may be driven in one direction and more power may be applied to the shafts than is possible in the ordinary form or type of gearing of this character.

It is a further object of the invention to provide a gearing of this type in which the gears carried by the shafts to be driven are driven upon opposite sides of their respective shafts.

With the above and other objects in view, reference is had to the accompanying drawings in which—

Figure 1:
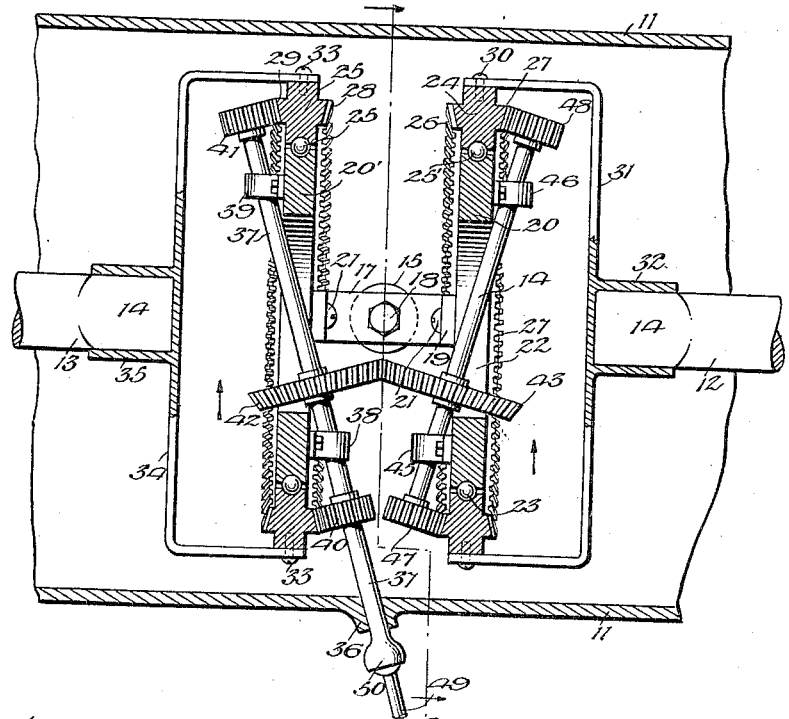
Figure 1 is a vertical sectional view of a gearing constructed in accordance with the present invention.
Figure 2:
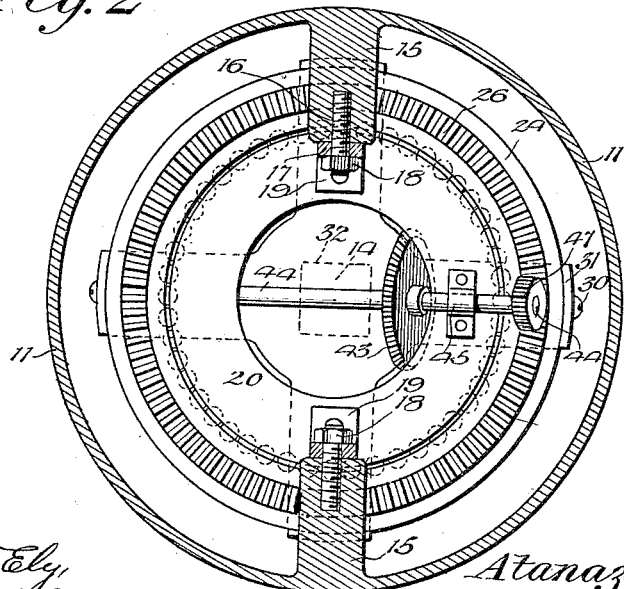
Fig. 2 is a vertical sectional view taken at right angles to Fig. 1 and on the line 2—2 of said figure.

Referring more particularly to the drawings, the reference character 11 designates a suitable housing and said housing is provided on its ends with bearings (not shown), which bearings support the outer ends of shafts 12 and 13, each of which has a squared inner end 14 for a purpose to be hereinafter described.

Formed integrally with the housing 11 at diametrically opposite points therein are lugs 15, and each of said lugs 15 is provided with an internally screw-threaded recess 16. Mounted on each of the lugs 15 is a substantially U-shaped bracket 17, and said bracket is secured in position by means of a cap screw or the like 18.

Each of the bracket members 17 is formed with leg portions 19, and said leg portions 19 are adapted to be rigidly secured to circular bearings 20, 20', by means of cap screws or the like 21. The circular bearings 20 are provided with a centrally disposed open portion 22, and in their outer periphery said bearings are each formed with a ball race 23. The reference character 24 designates a ring gear and 25 designates a similar ring gear, said ring gears 24 and 25 being adapted for mounting on the circular bearings 20 and 20', respectively, in parallelism to each other. It is understood that suitable roller bearings 25' are interposed between the ring gears 24 and 25 and their respective bearings.

The ring gear 24 is provided with oppositely disposed beveled teeth 26 and 27, and the ring gear 25 is provided with oppositely disposed beveled teeth 28 and 29. Secured to the ring gear 24 by cap screws or the like 30, is a yoke member 31, and said yoke member 31 has a squared socket 32 projecting therefrom, which is adapted to receive the squared end 14 of the shaft 12.

Secured to the ring gear 25 by cap screws or the like 33, is a yoke member 34, and said yoke member 34 has a squared socket 35 adapted to receive the squared end 14 of the shaft 13.

The housing 11 is provided with a bearing 36, and mounted in said bearing 36 is a shaft 37. This shaft 37 extends diagonally through the open space 22 of the circular bearing 20' and said shaft is mounted in bearings 38 and 39 carried on opposite sides of the circular bearing 20'. Carried by the shaft 37 and meshing with the gear teeth 28 of the ring gear 25, is a gear 40, and carried upon the end of said shaft 37 and meshing with the gear teeth 29 of the ring gear 25, is a gear 41. This shaft 37 also carries a bevel gear 42, and said bevel gear meshes with a second bevel gear 43. This second-mentioned bevel gear 43 is carried by a shaft 44, which extends diagonally through the circular opening 22 of the circular bearing 20 and said shaft is mounted in bearings 45 and 46 carried by the circular member 20. Mounted upon one end of the shaft 44 is a gear 47 and said gear 47 meshes with the teeth 26 of the ring gear 24, and mounted upon the opposite end of the shaft 44 is a gear 48, which meshes with the teeth 27 of the ring gear 24.

The gearing operates in the following manner:

The shaft 37 is driven by means of a shaft 49, which is connected to said shaft by means of a universal joint or the like 50. As the shaft 37 is driven, the ring gear 25 will be rotated owing to the engagement of the gears 40 and 41 with the gear teeth 28 and 29, respectively, of the ring gear 25. Owing to the fact that the gears 42 and 43 are in mesh with each other, the shaft 44 will be rotated and through the medium of the gears 47 and 48 engaging the gear teeth 26 and 27, the ring gear 24 will be rotated. As the ring gears 24 and 25 are rotated, the yokes 31 and 34, respectively, are rotated therewith, and inasmuch as these yokes each carry a squared socket adapted for engagement with the squared end of their respective shafts 12 and 13, said shafts will be rotated in the same direction.

From the foregoing it is apparent that the present invention provides a gearing whereby two shafts in alinement one with the other may be driven in the same direction, and that owing to the application of power to the opposite sides of the driving gear of each of said shafts, instead of at one point thereof, greater power may be communicated to the shafts than in the ordinary form of gearing.

What is claimed is:

1. In a gearing, a plurality of stationary circular bearing members, a ring gear mounted on each of said stationary circular bearing members, each of said ring gears being double faced, means for driving one of said ring gears, and means operated from the driving mechanism of the driven ring gear for driving the other ring gear, and a shaft carried by each of said ring gears and adapted to be driven thereby.

2. In a device of the character described, a plurality of stationary circular bearing members, a double faced ring gear mounted on each of said circular bearing members and adapted for rotary movement therearound, a shaft extending diagonally through each of said circular bearing members, a plurality of gears carried by each of said shafts and adapted to engage the teeth on opposite faces of their respective rings, and means for driving one of said shafts.

3. In a device of the character described, a plurality of stationary circular bearing members, a double faced ring gear mounted on each of said circular bearing members and adapted for rotary movement therearound, a shaft extending diagonally through each of said circular bearing members, a plurality of gears carried by each of said shafts and adapted to engage the teeth on opposite faces of their respective rings, and intermeshing gears carried by each of said shafts, whereby one of said shafts is driven from the other shaft.

4. In a gearing of the class described, a pair of alined shafts, a yoke carried by each of said shafts, a ring gear carried by each of said yokes, each of said ring gears having teeth on its opposite sides, a circular bearing member for each of said ring gears, a shaft projecting diagonally through each of said circular bearing members, gears carried by each of said shafts, one of which is adapted to engage the teeth on one side of each of its respective ring gear, the other gear being adapted to engage the teeth on the opposite side of its respective ring gear, means for driving one of said shafts, and intermeshing gears carried by said shafts whereby one of said shafts is driven from the other shaft.

ATANAZE SENIW.